Aug. 26, 1924.
J. E. PERRAULT
1,506,327
APPARATUS FOR CUTTING AND WINDING FABRIC STRIPS
Filed Feb. 17, 1922
4 Sheets-Sheet 1
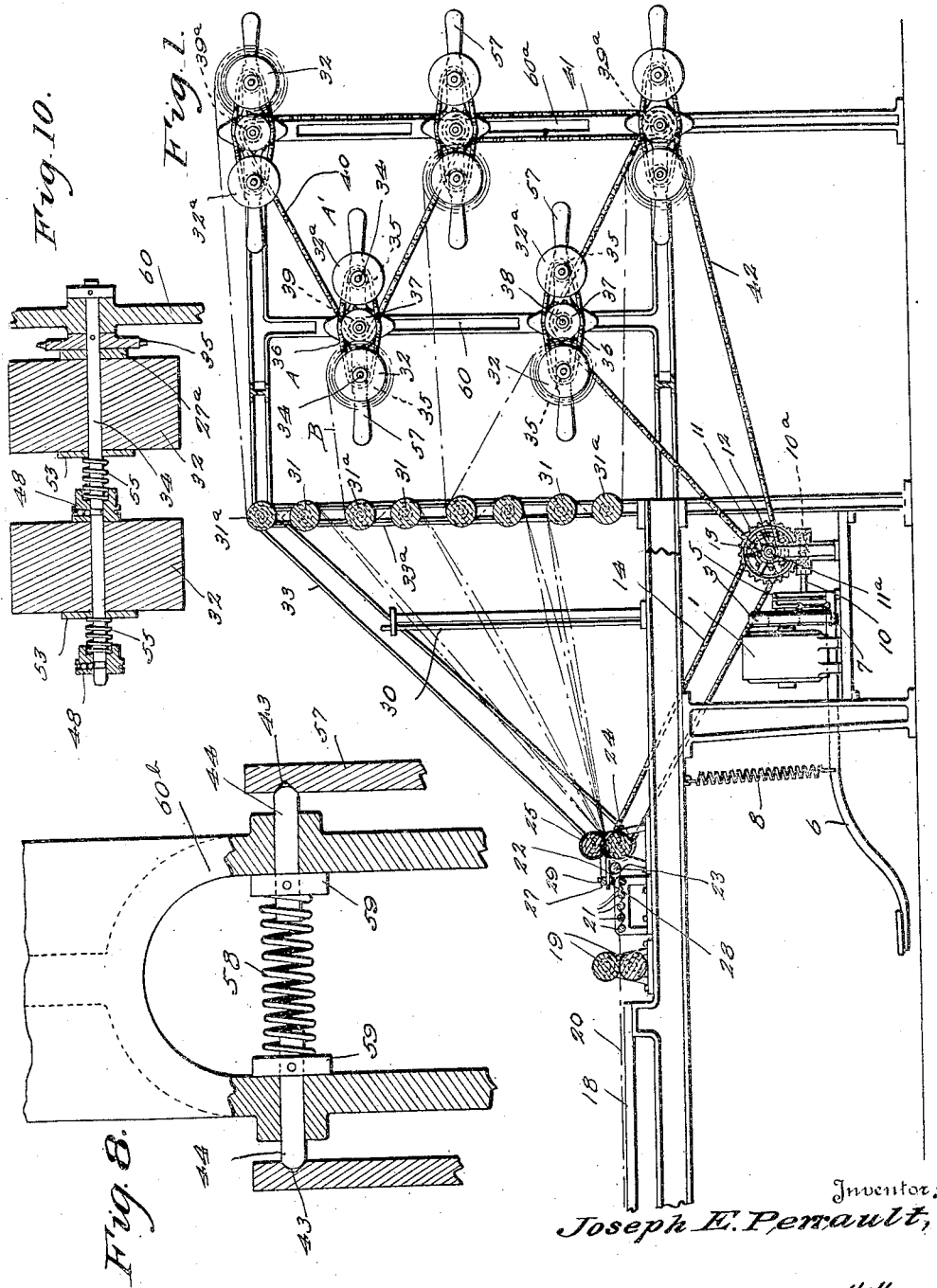
Inventor:
Joseph E. Perrault,

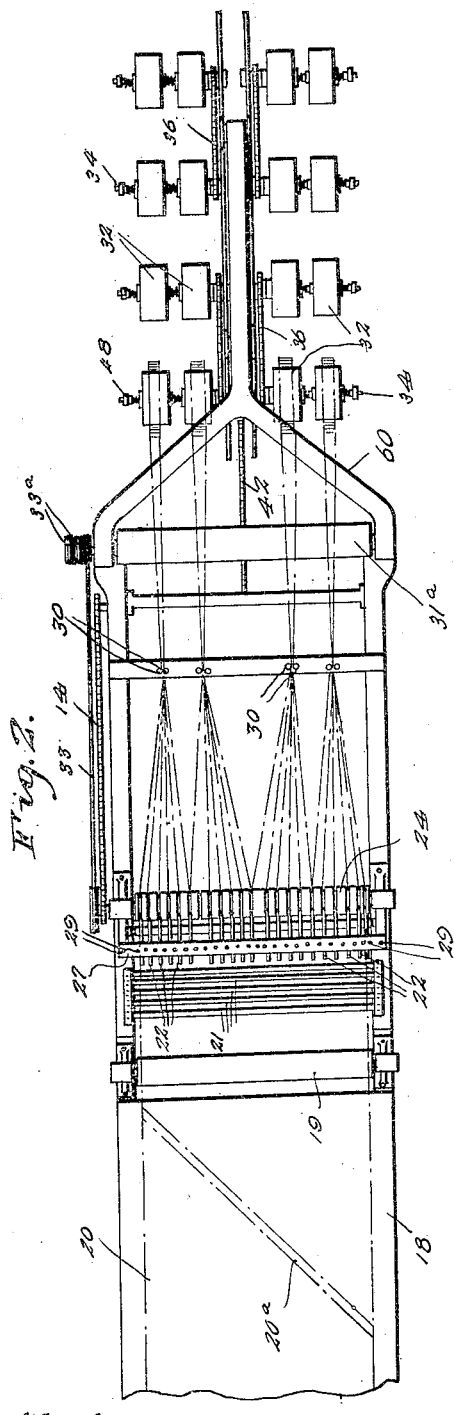

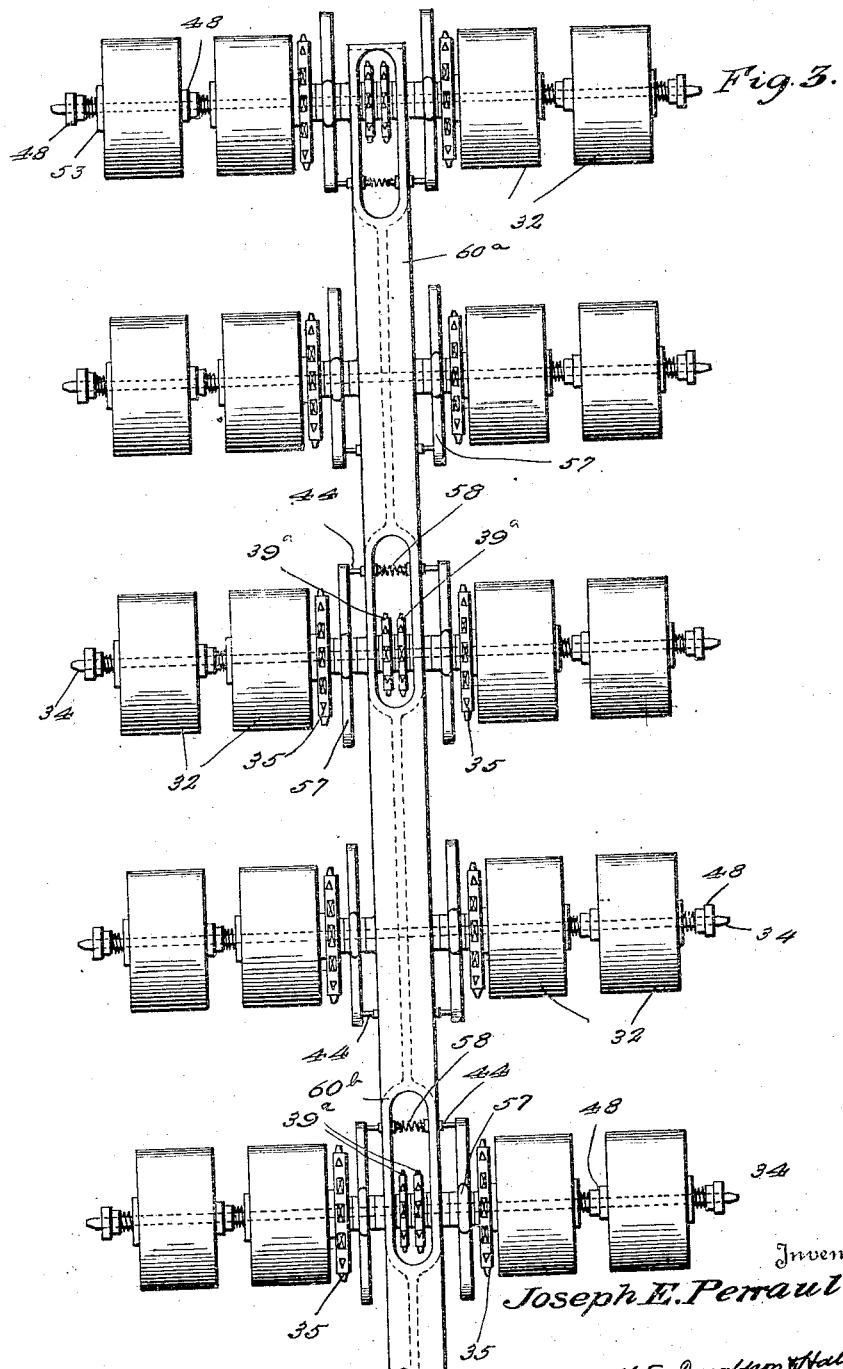

Aug. 26, 1924.
J. E. PERRAULT
1,506,327
APPARATUS FOR CUTTING AND WINDING FABRIC STRIPS
Filed Feb. 17, 1922  4 Sheets-Sheet 4
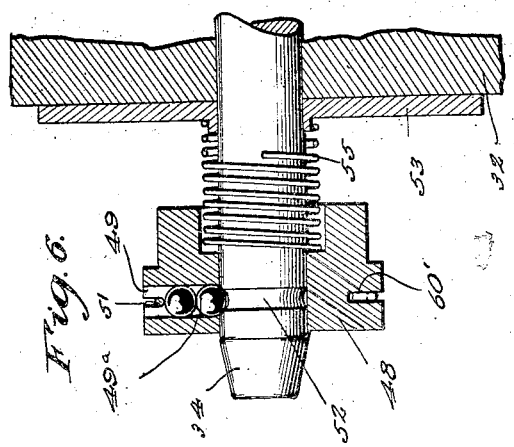
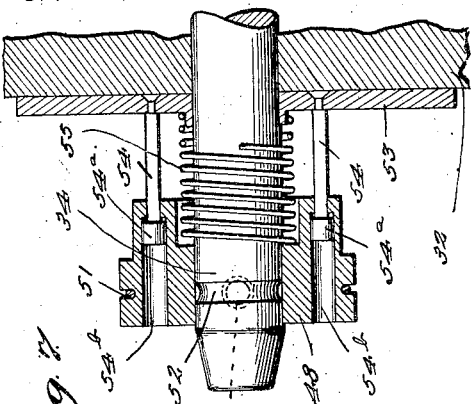
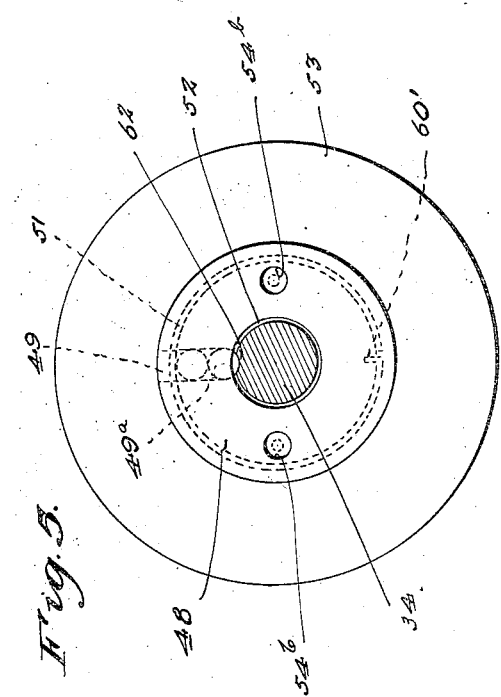
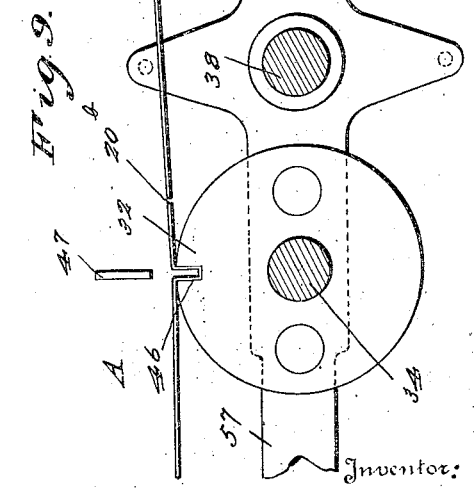
Inventor:
Joseph E. Perrault,
Witness Patented Aug. 26, 1924.

1,506,327

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

APPARATUS FOR CUTTING AND WINDING FABRIC STRIPS.

Application filed February 17, 1922. Serial No. 537,270.

*To all whom it may concern:*

Be it known that I, JOSEPH E. PERRAULT, a citizen of the United States, and a resident of Watertown, in the county of Middlesex and State of Massachusetts, have invented certain new and useful Improvements in Apparatus for Cutting and Winding Fabric Strips, of which the following is a specification.

My present invention relates to improvements in slitting and winding machines and more particularly to a machine designed to sever sheets of bias friction fabric into narrow strips, known to the trade as piping strips, and to wind such strips upon spools.

This fabric comes in wide sheets capable of being cut up or slitted into a large number of piping strips.

One object of the invention is to provide a simple, economical and compact machine for expeditiously slitting the sheets and reeling or spooling the resulting strips.

Another object is to provide a machine with means whereby fresh or unfilled spools may be expeditiously thrown into action and the filled spools removed.

A further object is to provide a machine in which proper tension will be applied to the strips throughout their passage through the apparatus.

With these and other objects in view, the invention includes the novel features of construction and arrangement and combination of parts hereinafter described and particularly defined by the appended claims.

What I at present regard as the preferred embodiment of my invention is illustrated in the accompanying drawings, in which:—

Figure 1 is a longitudinal vertical sectional view of a slitting and winding machine such as referred to;

Fig. 2 is a plan view;

Fig. 3 is an end elevation, partly broken away;

Fig. 4 is a detail of the driving mechanism viewed at right angles to Fig. 1;

Figs. 5, 6 and 7 are detail views of the spool clutching means;

Fig. 8 is a detail view of the locking or holding means for the spool carrying arms;

Fig. 9 is a detail view illustrating the application of a strip to a fresh spool.

Fig. 10 is a sectional detail of one of the spool carrying shafts with the spools assembled thereon.

Referring by reference characters to these drawings, in which the same or like reference characters designate the same parts wherever used, the numeral 1 designates a motor which is intended to be representative of any suitable source of power, and which drives a friction pulley 2 by means of a belt 3. The pulley 2 is journalled on a lever arm 4 pivoted at $5^a$ on the standard 5, the free end of the arm being connected to a treadle lever 6 by means of the link 7, the treadle lever being normally held elevated by a spring 8 connected respectively with the treadle lever and the frame of the machine. Adjacent the pulley 2 but normally disengaged therefrom is a friction drive pulley 9 which is so positioned that when pressure is applied to the treadle lever the movement of the lever 4 about its pivot $5^a$ will cause the friction pulley 2 to move towards the pulley 9 until the belt 3 is forced into frictional engagement with the surface of pulley 9, thereby driving the same. This pulley 9 is fast on a shaft 10 which carries a worm $10^a$ which meshes with a worm wheel 11 fast on a shaft $11^a$, which shaft carries sprockets 12 and 13, the former of which drives the rolls of the cutting apparatus through the chain 14, while the latter drives the spooling or reeling mechanism through the chain 42, all as hereinafter more fully set forth.

An idler pulley 15 pivotally carried on the end of swinging arm 16 is designed to take up the slack in the belt, this arm being under the tension of a spring 17, as shown, and this idler pulley also increases the area of belt contact on pulley 2 and compensates for the movement of said pulley.

The fabric to be cut into the piping strips may be fed to the slitting apparatus in any suitable manner. Frequently the bias fabric is in the shape of comparatively short sheets, the bias edges of which require to be joined together so as to form one long sheet and to facilitate this joining I provide a feed table 18 upon which the sheets 20 are placed successively and the edges overlapped, as indicated at $20^a$.

From this table the sheets are drawn through between a pair of pressing rolls 19 which compress the joint and strengthen the adhesion. Succeeding these rolls 19 are a plurality of tension rolls 21 which are mounted on parallel axes and in horizontal alignment, so that the sheet takes a zig-zag course in passing around the successive rolls, as shown in Fig. 1, the purpose of these rolls being to smooth out any wrinkles in the stock and hold it taut as it approaches the slitting knives 22.

A roll 23 is provided beneath the slitting knives, beneath which roll 23 the sheet passes and from which it is carried upward over the roller 24 and between it and the rubber covered roller 25. The roller 24 is preferably made of steel and is power driven by chain 14, hereinbefore referred to, and said roll 24 is provided with a plurality of annular grooves which correspond in number of and position to the slitting knives and also to the number of strips into which the fabric is to be sub-divided. The cutting edges of the knives rest in these grooves, so that as the sheet is drawn forward by the action of the rolls 24 and 25, it is drawn past the slitting knives and sub-divided into the requisite number of strips or ribbons.

The knives 22 are preferably removably secured to a bar 27 by means of clamps 28 and clamp screws 29, which permit of adjustment of the knives, and also their removal for sharpening.

From the slitting apparatus above described the strips or ribbons pass to a plurality of winding spools or drums; but as the sheets from which the ribbons are cut are of such width that a large number of ribbons or strips are produced, I provide a guiding arrangement which enables me to use a plurality of spools arranged in vertical alignment, thereby avoiding an excessive lateral spread of the spools, and hence produce a machine taking up a minimum amount of floor space. To this end I provide a plurality of vertical guide bars 30 which are so disposed that the ribbons make a quarter turn in passing the guide bars and the guide bars further being so positioned that the leading edges of the guide bars will be alined with the stock or winding spools 32, hereinafter described, this arrangement bringing all the ribbons in proper position with respect to the spools, no matter where they leave the rolls of the cutting device.

As the winding spools are located at various elevations, the ribbons, after leaving the guide rods, are passed around pairs of rollers 31, 31ª in a zig-zag manner, as shown, from which rolls 31ª the said ribbons are led to the winding drums. These rolls 31 and 31ª are driven in unison with the rolls 24 and 25 by belts 33 and 33ª passing around suitable pulleys, as shown.

It will be understood, of course, that any number of winding spools or drums may be used, according to the number of strips into which the sheet is to be divided. In the present instance, I have shown the machine as adapted to sever a sheet into twenty strips, and to this end have provided five sets of spooling devices of four spools to each set, and arranged in two vertical rows to give proper clearance, the rolls 31 being designed to feed the ribbons substantially horizontally to the winding spools.

In order to avoid the handling of any loose ends when a spool or drum has been filled and the ribbon must be severed, I provide a duplex arrangement of spools. It will be obvious that if I employed a spool revolving upon a fixed axis in position A, (Fig. 1) and were to sever the ribbon at B, when the spool was full, in order to remove the spool and supply an empty one in its place, this would leave a loose end at B, which would drop down and which would have to be handled and re-attached to the fresh spool, which, especially in a machine handling as large a number of ribbons, would be a very troublesome operation, to say nothing of the liability of the tacky ribbons or strips being twisted or knotted or otherwise damaged. To this end I provide the duplex arrangement of winding spools or drums, the spools being supported preferably in pairs, upon revoluble carriers, so that when one spool 32 is in position A and being operated for winding purposes, the other spool 32ª of its carrier will be in position A′, in which position it may readily be removed and replaced.

Supposing the spool shown at A, Fig. 1, to have been filled, and it being desired to remove this and replace it with a fresh unfilled spool, it is only necessary to revolve the carrier 57, hereinafter more fully described, in a clockwise direction. This imparts a planetary movement to the pair of spools about the axis of the carrier and brings the filled spool into position A′, and the fresh spool 32ª into position A, as shown in Fig. 9, in which position the ribbon will lie across the surface of the spool and may be attached or caused to adhere thereto in a suitable manner, and the portion of the ribbon between the two spools may then be severed, as indicated at 20ᵇ.

A convenient manner of uniting the severed end of the ribbon to the spool is to provide the spool with a transverse slot 46 into which a loop of the ribbon can be forced by a suitable blunt tool or blade 47, the tacky nature of the ribbon causing it to be securely held in the slot by frictional engagement.

While I have referred to the spools at positions A and A′ in the singular, my arrangement contemplates a similar operation of all of the pairs of spools in horizontal alignment. This requires a peculiar method of operation which will now be described.

The main frame of the machine, indicated at 60, is so shaped at the rear end as to provide vertical supporting standards 60 and 60ª which are provided with bifurcated portions.

Shafts 38 are journalled in the parallel walls 60ᵇ of these bifurcated portions and project through said walls, and on the projected ends are journalled the duplex spool carriers 57, hereinbefore referred to, this affording a simple and convenient manner of mounting the carriers. Shafts 38 of the standard 60 have fast thereon sprocket wheels 39 and the corresponding shafts 38 of the standard 60ª carry fast thereon pairs of similar sprocket wheels 39ª for driving purposes, as hereinafter described.

The duplex spools or drums 32 are frictionally carried in the manner hereinafter described by spindles 34, which are journalled in the arms of the carrier 60 on diametrically opposite sides of the center thereof, and these spindles have fast thereon sprocket wheels 35 which are engaged by a chain 36 which also meshes with a sprocket wheel 37 fast on shaft 38.

While I have used the singular in referring to these parts, it will be observed that the arrangement is duplicated, there being a carrier located on each side of its supporting standard, with corresponding spools carried thereby.

The sprocket chain 42 passes around the drive sprocket 13, hereinbefore referred to, and also passes around one of the sprockets 39ª at the lower portion of standard 60ª, and also around the sprocket 39 at the lower portion of standard 60, and thus drives the respective shafts 38, and through the sprockets 37 on these shafts drives the sprockets 35, spindles 24, and spools carried thereby.

A sprocket chain 41 passes around the other of the lower sprockets 39ª, above referred to, and also around the corresponding sprocket 39ª of the shaft 38 next above the same on standard 60ª.

Sprocket chain 40, passing around companion sprocket on this last named shaft 38, and around sprocket 39 of the uppermost shaft 38 of standard 60, and around sprocket 39 of the topmost shaft 38 of standard 60ª, drives the remaining three shafts 38, and in the manner already described drives the spools or drums of the carriers associated with these shafts. To insure the carriers being held in proper position but enable them to be readily shifted to reverse the position of the winding spools or drums, I provide detent means which, in the embodiment shown, takes the form of yielding pins 44 having rounded or beveled ends designed to engage corresponding recesses 43 in the inner faces of the carrier members. These pins pass through openings in the parallel walls of the bifurcated portions of the standards and are provided with collars 59 which limit their outward movement and serve also as the bearing for the outer ends of the spring 68, which serves to press the pins outwardly in opposite directions, the springs being held in place by the inwardly extending but spaced inner ends of the pins, as clearly shown in Fig. 8. The engagement of the outer ends of the pins with the recesses in the carriers 43 affords sufficient resistance to prevent the movement of the carriers, but by taking hold of the handle extension 57 and applying force, the ends of the pins will be sprung out of the recesses, and when the carriers are swung to reverse position, the pins will again spring into the recesses and hold them in position.

A convenient manner of assembling and holding the spools upon the spindle and frictionally driving the same is illustrated in the drawings (Figs. 5 to 7 and Fig. 10) and will now be described. The spools are bored to slide freely upon the spindles 34 so as to be freely removable, the innermost spool of each pair being preferably spaced from the driving sprocket by a collar or washer 27ª. Adjacent each other spool or drum is a friction disc 53 which may have a suitable friction surface adapted to frictionally engage the corresponding face of the respective drum or spool 32.

A spring 55 bears against the outer face of the friction disc and the spring is held under compression by a removable collar 48 which has a counter-bore to receive the corresponding end of the spring. This collar has a radial opening 49 in which is located a ball retainer 49ª which is in alignment with an annular groove 52 on the spindle 34 and the spindle also has at one point in said groove a recess or depression 62. When the ball 49ª rests in the recess 62 the collar will be caused to rotate with the spindle, and as the friction disc is keyed to the collar in the manner hereinafter described, so as to necessarily rotate with the collar, the spool will be frictionally driven from the spindle. If the driving strain should exceed a certain amount, the ball 49ª will be forced out of the recess 62 which will allow the spindle to make an idle revolution, the ball travelling in the annular groove 52, and hence preventing longitudinal displacement of the collar upon the shaft.

Owing to the length of the opening 49 in the collars, I provide follower means, which may be in the shape of another ball, as shown, the two balls being drawn into position by a spring 51 which lies in an annular groove of the collar, and has inwardly turned ends seated in a recess 60' to retain the spring in position.

My preferred means for coupling the collar and friction discs together consists of pins 54 secured to the friction disc and passed through openings in the wall of the collar, and having enlarged heads 54ª fitting in counter-bored recess portions 54ᵇ, by which means the collars and friction discs are permanently connected, so that the collars, friction discs and interposed springs may be removed and replaced in assembled condition.

While I have shown a pair of spools or drums upon each shaft 34 it will be understood that this is simply as an example, and that my invention contemplates the use of any number which may be desired.

Having thus described my invention, what I claim is:—

1. In apparatus of the class described, the combination with means for feeding a sheet of tacky material, such as friction fabric, of a winding drum having a longitudinal narrow and relatively deep groove with substantially parallel walls into which groove a portion of the sheet may be forced by a thin bladed instrument and retained solely by frictional contact with said walls.

2. In apparatus of the class described, a standard, a drive shaft journaled therein, with means for operating it, said shaft projecting on one side of the standard, a driving gear fast on said projecting portion, a spool carrier rotatable about said projecting portion, a plurality of spools carried by said carrier, gears supported by the carrier for rotating said spools, and sprocket chains passing around said driving gear and said spool operating gears.

3. In apparatus of the class described, a support having spaced wall portions, a driving shaft journaled in said wall portions, a driving wheel fast on said shaft between said wall portions with means for operating it, said shaft projecting through said wall portions, driving wheels fast on said projecting portions, spool carriers rotatably mounted on said projecting portions, spindles rotatably mounted on said carrier on opposite sides of said shaft portions, means for driving said spindles from said driving wheels, spools on said spindles, and means for rotating said carrier and for holding it in desired positions.

4. In apparatus of the class described, a support having spaced wall portions, a driving shaft journaled in said wall portions, a driving wheel fast on said shaft between said wall portions with means for operating it, said shaft projecting through said wall portions, driving wheels fast on said projecting portions, spool carriers rotatably mounted on said projecting portions, spindles rotatably mounted on said carrier on opposite sides of said shaft portions, a plurality of spools detachably and frictionally held on each spindle, means for driving said spindles from said driving wheels, spools on said spindles, and means for rotating said carrier and for holding it in desired positions.

5. In apparatus of the character described, a plurality of pairs of drums or spools arranged at different elevations, means for rotating the drums to effect winding the material thereon, and means for imparting to each pair of drums a planetary movement about a common axis.

6. In apparatus of the class described, a winding spindle with means for operating it, said spindle having a free portion projecting from said operating means, a winding spool detachably held on said free portion, a removable friction disc cooperating with the spool, a spring removably held on the spindle and normally pressing the disc towards the spool, and means for locking the disc.

7. In a machine of the class described, a winding spindle with means for operating it, said spindle having a free portion projecting from the operating means, a spool thereon, a friction disc loose on the spindle, a spring encircling the spindle and bearing against the disc, a collar detachably held on the spindle and bearing against the spring, and means directly connecting said collar and disc whereby said collar and disc are caused to rotate in unison and are removable from the shaft as a unit.

8. In a machine of the class described, a winding spindle with means for driving it, said spindle having a free projecting end portion a spool or drum on said portion of the spindle, a friction disc loose on said portion of the spindle cooperating with said spool, a spring for securing frictional contact of the disc and spool, a member on the said spindle portion for holding said parts thereon, said member being detachable from the spindle portion yielding means for holding said member on the spindle and also for holding it against rotary movement thereon, and means for causing the friction disc and member to rotate in unison, said means connecting the member and disc so that they are removable from the spindle as a unit.

9. In a machine of the class described, a winding spindle journaled at one end only, with means for driving it, a spool or drum removably held on the spindle, a friction disc removably held on the spindle and cooperating with said spool, an annular member detachably held on the spindle and spaced from said friction disc, a spring encircling said spindle between said disc and annular member, said disc and member having annular portions overlapping the end coils of the spring, said annular member having a plurality of lengthwise passages with reduced inner ends, and correspondingly positioned pins rigidly connected at one end with said disc and having their opposite ends provided with headed portions slidably retained in said passages.

10. The combination with a rotatable spindle supported at one end only leaving a free portion, of a winding spool on said free portion, and a friction clutch assemblage bodily removable from and replaceable on said free portion and comprising an annular ring shaped friction disc, an annular collar spaced therefrom, means permanently uniting said disc and collar while permitting limited movement toward and from each other, a helical spring having its ends centered by said disc and collar, and means for detachably holding said collar on said shaft.

11. The combination with a rotatable spindle supported at one end only leaving a free portion, of a winding spool on said free portion, and a friction clutch assemblage bodily removable from and replaceable on said free portion and comprising an annular ring shaped friction disc, an annular collar spaced therefrom, means permanently uniting said disc and collar while permitting limited movement toward and from each other, a helical spring having its ends centered by said disc and collar, said shaft having an annular groove with a deeper recess at one point, and said collar having a yielding detent cooperating with said groove and recess, and serving both to detachably lock said collar on the shaft and hold the collar yieldably against rotation.

12. In apparatus of the class described, the combination with a spindle having a free portion and a winding spool thereon, of clutch mechanism for connecting said spool to said shaft, and means for detachably connecting said clutch mechanism to the free portion of the shaft, and releasably holding it against rotation, comprising a collar loose on the shaft, said shaft having an annular groove with a deepened recess at one point, and said collar a ball receiving recess aligning with said groove, and a spring pressed ball seated in said recess in the collar and cooperating with the annular groove and recess in the spindle.

13. The combination with a spindle having a free portion and driving means, of a plurality of winding drums or spools removably held thereon, a self contained friction clutch device for each spool, and means whereby each friction clutch device is removably held to the spindle.

14. The combination with a spindle having a free portion and driving means, of a plurality of winding drums removably held thereon, a clutch device for each drum removably held on said shaft, and means for locking said clutch devices on the shaft against lengthwise movement and releasably holding them against relative rotary movement.

15. In apparatus of the character described, a plurality of sets of drums or spools arranged at different elevations, means for rotating all said drums in unison, and means for imparting to the drums of each set a planetary movement about a common axis.

16. In apparatus of the character described, a plurality of sets of drums or spools, means for rotating all said drums in unison, each about its own axis, and means for imparting to the drums of each set a planetary movement about a common axis.

17. In apparatus of the class described, a plurality of spools or drums arranged in sets in a plurality of rows, the sets in one row alternating in position with those of the adjoining row, means for rotating said drums about their own axes to wind material thereon, and means for imparting intermittent planetary movement to each of said sets of drums about a common axis.

18. A winding machine for spooling a plurality of strips issuing from a source of supply, edge to edge in the same plane, comprising feed rolls, a plurality of spools for winding said strips arranged in different planes which are perpendicular to the plane of the strip, and vertical guides interposed between said feed rolls for turning the strips into vertical planes, the leading edges of the guides being in alignment with the respective spools.

In testimony whereof I affix my signature.

J. E. PERRAULT.